A. L. CLEAVER.
BICYCLE HUB BRAKE.
APPLICATION FILED JAN. 14, 1919.
1,317,554.
Patented Sept. 30, 1919.
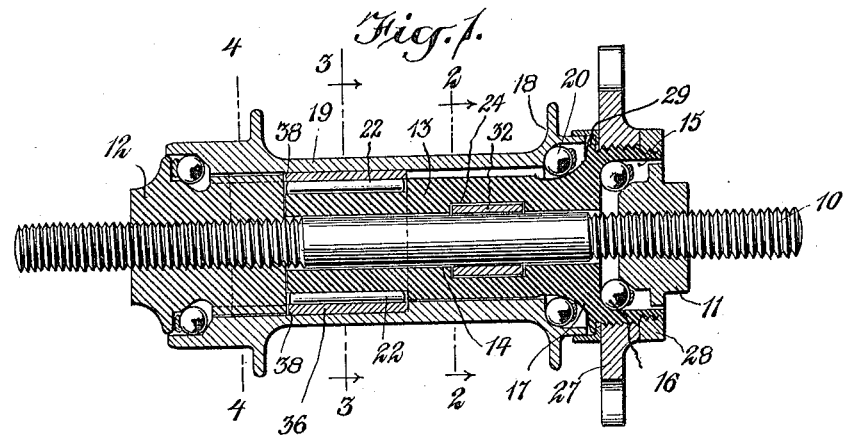
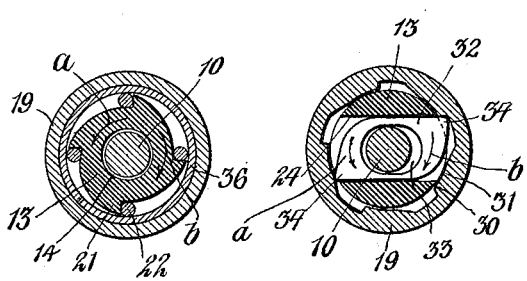
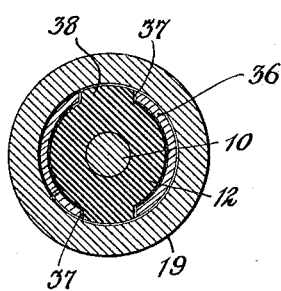
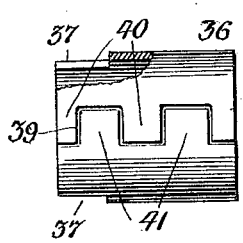
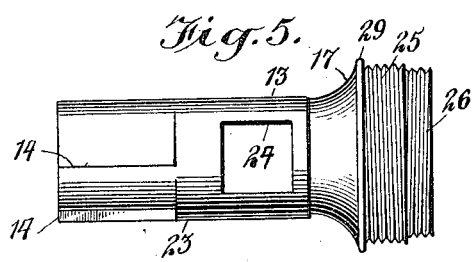
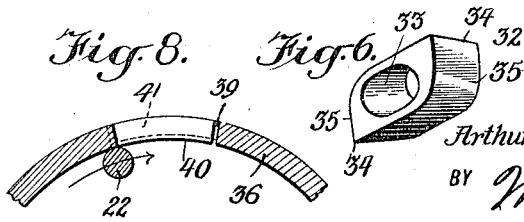
WITNESSES
INVENTOR
Arthur L. Cleaver
BY
ATTORNEYS

UNITED STATES PATENT OFFICE.

ARTHUR LESTER CLEAVER, OF PETERBOROUGH, ONTARIO, CANADA.

BICYCLE HUB-BRAKE.

1,317,554.   Specification of Letters Patent.   Patented Sept. 30, 1919.

Application filed January 14, 1919. Serial No. 271,113.

*To all whom it may concern:*

Be it known that I, ARTHUR LESTER CLEAVER, a citizen of the United States, and a resident of Peterborough, Ontario, Canada, have invented a new and Improved Bicycle Hub-Brake, of which the following is a full, clear, and exact description.

This invention relates to vehicle brakes or brakes of that nature that are commonly used in connection with foot-propelled vehicles, such as bicycles, although I would have it distinctly understood that certain features of the invention are applicable for use in connection with crank-operated mechanisms along other arts.

Among the objects of the invention is to simplify the construction of a bicycle hub brake, and thereby several distinct advantages are realized. For example, the mechanism being simpler to make than hub brakes as usually made heretofore, is obviously cheaper, and being less complicated than known brakes is more dependable in practice and, consequently, is not so likely to either get out of order or require frequent adjustment or reconstruction.

Another object of the invention is to provide a bicycle hub brake or the like having direct and positive forward driving connections between the sprocket wheel and the hub proper and with a very slight amount of lost motion incident to a prior actuation of the brake.

A further object of the invention is to provide a new and highly efficient expansible brake sleeve, the same having a peculiarly arranged means for expanding it.

With the foregoing and other objects in view, the invention will be understood in connection with the accompanying drawings showing a preferred embodiment thereof but with the understanding that relative sizes and proportions of the parts may be varied and that any suitable materials may be employed in the construction.

In connection with the accompanying drawings, similar parts in the various figures being referred to by similar reference characters, Figure 1 is a vertical longitudinal section of my complete device shown in connection with a rear axle and stationary bearing cones of a standard bicycle;

Figs. 2, 3 and 4 are vertical transverse sections of the same on the corresponding lines of Fig. 1;

Fig. 5 is a side elevation of the brake hub detached;

Fig. 6 is a detail perspective view of the driving dog;

Fig. 7 is a side elevation of the brake sleeve detached; and

Fig. 8 is a detail view indicating the preferred structure of the brake sleeve.

Referring now more specifically to the drawings, 10 is the rear axle having fixed on or adjacent to the opposite ends thereof the right and left bearing cones 11 and 12 respectively. These parts are stationary, as is usual in bicycle practice, being so held by the frame connections (not shown).

13 indicates as a whole what I term the brake hub, the same being a strong piece of metal having the general approximation of a cylinder in form and having a central hole 14 through which the shaft 10 extends. One end of the hub 13 is shaped to constitute a bearing cup 15 between which and the cone 11 a series of anti-friction rollers 16 are located, while the outside of the same end constitutes a bearing cone 17 between which and a cupped end 18 of the wheel hub 19 are a second series of anti-friction rollers 20. The opposite end of the brake hub is provided with a plurality of cam shoulders 21 with each of which coöperates a rolling wedge 22, shown in the form of a cylinder. Intermediate of the ends of the brake hub the body portion thereof may be left essentially cylindrical, providing however a shoulder 23 extending radially outward of the cam shoulders 21. Formed directly and diametrically through this cylindrical central body portion is a hole 24, preferably rectangular in cross section and which intersects the central hole 14 of the hub. The first mentioned end of the hub 15 is shown as being provided with right and left threads 25 and 26 respectively for the accommodation of the sprocket wheel 27 and lock nut 28 respectively of well known nature, and there is also provided a shoulder 29 against which the sprocket wheel is screwed.

The interior of the wheel hub 19, as shown best in Fig. 2, is provided with any suitable number of equally spaced abrupt shoulders 30, preferably of an uneven number, and between each of these shoulders and the next is a cam 31, the structure of the shoulder and cam being identical.

Loosely surrounding the axle 10 and slidably fitted in the hole 24 of the brake hub is a driving member or dog 32. (See Fig. 6). The dog is provided with a transverse hole 33 of elliptical form provided for the free reciprocating movement of the dog transverse to the axis of the axle. At each end of the dog there is formed a relatively sharp shoulder or tooth 34 whence the material of the dog is reduced in length rearward forming a rounded cam surface 35. Each tooth 34 is adapted to engage squarely against any one of the shoulders 30 of the surrounding wheel hub, while the opposite tooth 34 engages the cam 31 opposite the engaged shoulder. The effective length of the dog between the points of the teeth 34 is therefore as much greater than the inside diameter of the wheel hub as the depth of one shoulder 30.

Surrounding the series of roller wedges 22 is a brake sleeve 36, shown as a hollow cylindrical shell having a smooth outer surface adjacent to and adapted to engage frictionally with the inner smooth cylindrical surface of that portion of the wheel hub 19 remote from the shoulder portion thereof. This brake sleeve is held stationary by any suitable means in connection with the cone 12, and to this end I provide one or more notches 37 at the left end thereof into which a like number of lugs or projections 38 extend from the inner end of the cone 12. The lugs 38 are shown as being arranged radially outside of the rollers 22 and, consequently, the end of the cone 12 between the lugs 38 is substantially flat and serves to limit endwise movement of the rollers away from the brake hub. The sleeve 36 is split longitudinally as at 39 to provide for the necessary expansion during the braking action, and to accommodate the rollers the line along which the sleeve is split is preferably a sinuous one or one provided with interengaging teeth and notches. As shown in Fig. 8, I preferably form one set 40 of these teeth of full thickness, while the alternate teeth 41 are thinner than the shell, whereby any roller engaged at this region by a cam shoulder 21 will not cause the gripping of both sets of the teeth at the same time and thereby prevent the expansion of the sleeve.

The general operation of this device is the same as is usual in hub brakes, the forward action of the driving gear serving to cause the forward actuation of the machine while a reverse movement of the driving gear serves to unlock the positive driving connections and establish the braking action. More specifically, in the operation of my device, the forward actuation of the driving gear causes a rotation of the brake hub 13 in the direction of the arrow a, Fig. 2. In this forward actuation of the hub 13, one of the teeth 34 of the driving dog will be caused positively to engage a shoulder 30 by virtue of the contact between the opposite tooth and the cam 31 adjacent thereto. Thus, the wheel hub 19 will be given a direct forward rotation and with a minimum amount of lost motion. During this forward movement the brake will be idle, by reason of the fact that the hub 13 moving in the same direction as before, as indicated by the arrow a, Fig. 3, all of the rollers will be carried in the deepest portions of the cam notches, and the sleeve 36 will be in its minimum diameter and free from the surrounding wheel hub. The moment the driving gear is reduced in speed with respect to the rotation of the wheel, or reversed in its direction, the dog 32 becomes idle, since the rounded surfaces 35 thereof wipe idly over the cam surfaces 31 in the relative direction indicated by the arrow b, Fig. 2. This same relative direction however, as indicated on Fig. 3, will cause the rollers 22 to ride up on the cams 21, causing the expansion of the brake sleeve and the frictional gripping of the outer surface thereof against the inner surface of the wheel hub, with a force proportional to the intensity of the relatively rearward actuation of the driving means. It will thus be seen that my construction is made up with a minimum number of parts, and that those that are depended upon chiefly for the heaviest work, namely, the dog and the coöperating flat-faced shoulders 30, are of the strongest and most reliable nature, making it practically impossible for any breakage to occur or deteriorating wear to take place. Obviously between the above described driving and braking action there is an intermediate stage, known as coasting, and whereby the operator may hold the pedals in idle position.

I claim:

1. In a brake of the class set forth, the combination with an axle and a driving member surrounding the same, of a brake hub to which said driving member is connected, a wheel hub surrounding the brake hub, said wheel hub being provided on its inner surface with an uneven number of equally spaced shoulders from each of which there extends a forwardly-directed cam, a driving dog extending diametrically through the brake hub and having points at its opposite ends adapted to coöperate respectively with one of said shoulders and the cam directly opposite the engaged shoulder, and a braking device between the brake hub and the wheel hub caused to be made operative by the reverse movement of the driving member and brake hub.

2. In a brake of the class set forth, the combination of a stationary shaft, a brake hub journaled for rotation therearound, means to rotate the hub in either direction, said hub having a diametrical hole extending therethrough and through which the shaft extends, a driving dog mounted in said hole and adapted to reciprocate radially therein with respect to the hub, said dog having an opening through which the shaft projects, and having forwardly directed points at its opposite ends, the length of the dog between the points being greater than the diameter of the hub through which it projects, and each end of the dog being reduced and rounded at the rear of its point, a wheel hub journaled for rotation upon the brake hub and having formed on its inner surface an uneven number of equally spaced shoulders with any one of which either point of the dog is adapted to engage for forward driving purposes, there being provided between each two shoulders a cam coöperating with the point of the dog directly opposite the engaging point, whereby the engaging point is caused to come into and be held in engaging position with its shoulder, and braking devices between the brake hub and the wheel hub brought into action by the driving of the brake hub in a backward direction.

3. The herein described hub brake comprising a brake hub, means to rotate the same in either direction, a driving dog mounted to reciprocate diametrically of the brake hub and having end points adapted to extend beyond the circumference of the hub in alternation, a wheel hub surrounding the brake hub, said wheel hub having a circumferential series of alternate notches and projections, the projections extending inward into proximity to the outer surface of the brake hub, said notches and projections being so constructed with respect to the driving dog as to cause one end of the driving dog to engage a shoulder of one of the notches, while the remote end of the dog is engaged by one of the projections, thereby insuring positive forward driving action between the brake hub and the wheel hub, and braking means acting between the brake hub and the wheel hub when the brake hub is rotated in the opposite direction.

4. In a hub brake, the combination of a brake hub having formed around one portion thereof a series of cams each terminating in a shoulder, a series of cylindrical rollers located in the depressions in advance of the cam shoulders, a split sleeve surrounding the cams and rollers, the split portion of the sleeve being provided with interspaced fingers, the fingers on one side of the split being thicker than those on the opposite side of the split whereby any roller spanning all of the fingers will have engagement with one set thereof only, means to actuate the brake hub to cause the cams to expand the sleeve through the rollers, a wheel hub surrounding the sleeve with which the sleeve is adapted to make frictional contact for braking, and means acting between the brake hub and the wheel hub to cause the forward driving of the wheel hub.

ARTHUR LESTER CLEAVER.

Copies of this patent may be obtained for five cents each, by addressing the "Commissioner of Patents, Washington, D. C."